US012700927B2

(12) United States Patent
Borlaug

(10) Patent No.: US 12,700,927 B2
(45) Date of Patent: Aug. 4, 2026

(54) TUNABLE OPTICAL CARRIER-TO-SIDEBAND RATIO FILTERING AND DOWN-CONVERTING COHERENT RADIO FREQUENCY (RF) PHOTONIC LINK

(71) Applicant: Raytheon Company, Tewksbury, MA (US)

(72) Inventor: David B. Borlaug, Harbor City, CA (US)

(73) Assignee: Raytheon Company, Arlington, VA (US)

(*) Notice: Subject to any disclaimer, the term of this patent is extended or adjusted under 35 U.S.C. 154(b) by 236 days.

(21) Appl. No.: 18/679,259

(22) Filed: May 30, 2024

(65) Prior Publication Data

US 2025/0373337 A1    Dec. 4, 2025

(51) Int. Cl.
*H04B 10/516*          (2013.01)

(52) U.S. Cl.
CPC ..... *H04B 10/5165* (2013.01); *H04B 10/5161* (2013.01); *H04B 2210/006* (2013.01)

(58) Field of Classification Search
None
See application file for complete search history.

(56) References Cited

U.S. PATENT DOCUMENTS 6,487,004 B1    11/2002  Strutz et al.
6,643,417 B2    11/2003  Strutz et al.

OTHER PUBLICATIONS

Tu et al. "Silicon RF-Photonic Filter and Down-Converter", Oct. 15, 2010, Journal of Lightwave Technology, IEEE, USA, vol. 28, No. 20, pp. 3019-3028 (Year: 2010).*
Borlaug, "Single-Sideband Reduced-Carrier Phase-Shifting Electro-Optic Modulator", U.S. Appl. No. 18/214,487, filed Jun. 26, 2023, 22 pages.
Lim et al., "Analysis of Optical Carrier-to-Sideband Ratio for Improving Transmission Performance in Fiber-Radio Links", IEEE Transactions on Microwave Theory and Techniques, vol. 54, No. 5, May 2006, 7 pages.

(Continued)

*Primary Examiner* — David W Lambert

(57)          ABSTRACT

A method includes generating first and second optical carrier signals having a specified frequency offset. The method also includes modulating an RF input signal onto a portion of the first optical carrier signal to generate modulated optical signals, where the modulated optical signals include the portion of the first optical carrier signal and sideband signals. The method further includes suppressing the portion of the first optical carrier signal in the modulated optical signals to generate carrier-suppressed single sideband signals. The method also includes optically filtering the carrier-suppressed single sideband signals to generate filtered carrier-suppressed single sideband signals. The method further includes combining the filtered carrier-suppressed single sideband signals with portions of the second optical carrier signal to generate frequency-converted optical signals. In addition, the method includes generating an output RF signal based on the frequency-converted optical signals. Each frequency-converted optical signal has an optical carrier-to-sideband ratio (OCSR) that is controllable.

20 Claims, 8 Drawing Sheets

(56) References Cited

OTHER PUBLICATIONS

Li et al., "Performance analysis of an optical single sideband modulation approach with tunable optical carrier-to-sideband ratio", Optics & Laser Technology, vol. 48, Jun. 2013, 6 pages.

Han et al., "Single-Chip Integrated Electro-Optic Polymer Photonic RF Phase Shifter Array", Journal of Lightwave Technology, vol. 21, No. 12, Dec. 2003, 5 pages.

Tang et al., "Photonic microwave downconverter based on an optoelectronic oscillator using a single dual-drive Mach-Zehnder modulator", Optics Express, vol. 22, No. 1, Jan. 2014, 6 pages.

Meng et al., "Chip-integrated metasurface for versatile and multi-wavelength control of light couplings with independent phase and arbitrary polarization", Optics Express, vol. 27, No. 12, Jun. 2019, 15 pages.

Liang et al., "Programmable RF Receiver Related On-Chip Photonic Processor", IEEE Photonics Journal, vol. 13, No. 1, Feb. 2021, 11 pages.

Kim et al., "All-optical frequency downconversion technique utilizing a four-wave mixing effect in a single semiconductor optical amplifier for wavelength division multiplexing radio-over-fiber applications", Optics Express, vol. 20, No. 7, Mar. 2012, 8 pages.

Wang et al., "Optical single sideband modulation with tunable optical carrier-to-sideband ratio using DP-BPSK modulator" Abstract, Optics & Laser Technology, vol. 136, Apr. 2021, 2 pages.

International Search Report and Written Opinion of the International Searching Authority dated Oct. 14, 2025 in connection with International Patent Application No. PCT/US2025/031417, 13 pages.

Tu et al., "Silicon RF-Photonic Filter and Down-Converter," Journal of Lightwave Technology, vol. 28, No. 20, Oct. 2010, 10 pages.

* cited by examiner

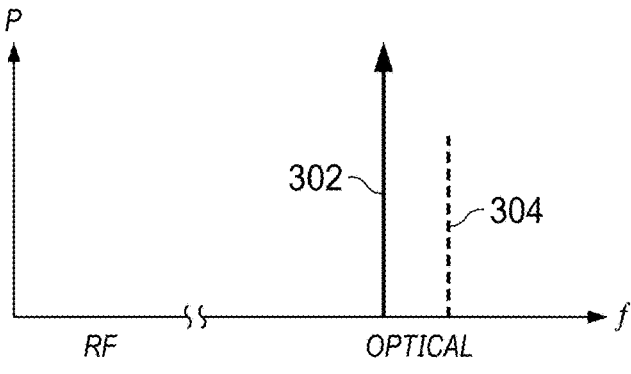
FIG. 3A
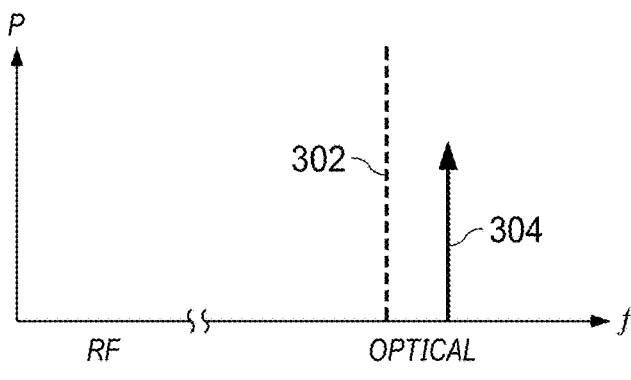
FIG. 3B
FIG. 3C

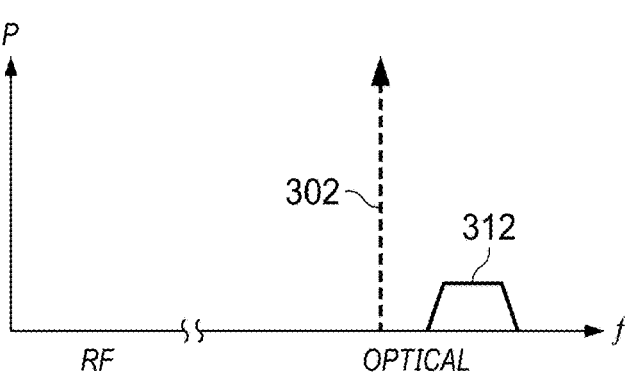
FIG. 3F
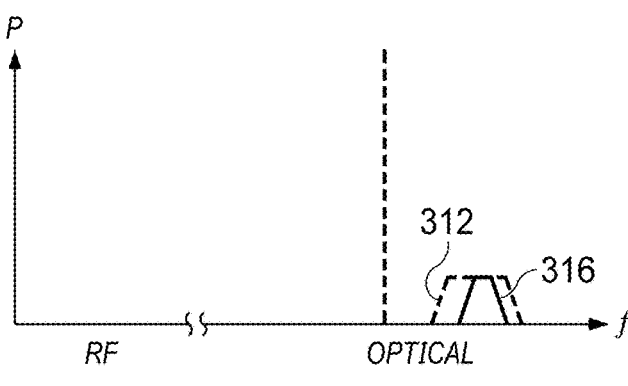
FIG. 3G
FIG. 3H

400

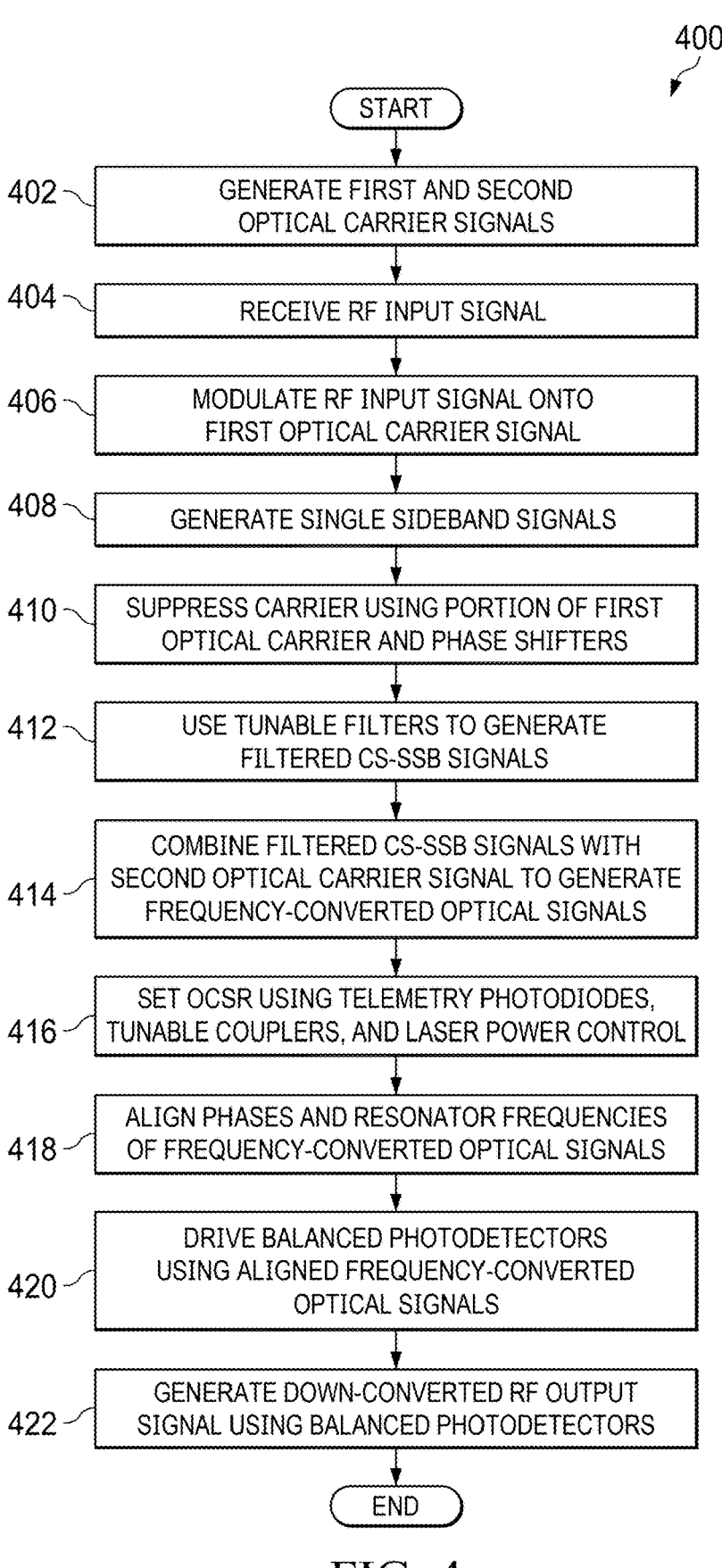

START

402 — GENERATE FIRST AND SECOND OPTICAL CARRIER SIGNALS

404 — RECEIVE RF INPUT SIGNAL

406 — MODULATE RF INPUT SIGNAL ONTO FIRST OPTICAL CARRIER SIGNAL

408 — GENERATE SINGLE SIDEBAND SIGNALS

410 — SUPPRESS CARRIER USING PORTION OF FIRST OPTICAL CARRIER AND PHASE SHIFTERS

412 — USE TUNABLE FILTERS TO GENERATE FILTERED CS-SSB SIGNALS

414 — COMBINE FILTERED CS-SSB SIGNALS WITH SECOND OPTICAL CARRIER SIGNAL TO GENERATE FREQUENCY-CONVERTED OPTICAL SIGNALS

416 — SET OCSR USING TELEMETRY PHOTODIODES, TUNABLE COUPLERS, AND LASER POWER CONTROL

418 — ALIGN PHASES AND RESONATOR FREQUENCIES OF FREQUENCY-CONVERTED OPTICAL SIGNALS

420 — DRIVE BALANCED PHOTODETECTORS USING ALIGNED FREQUENCY-CONVERTED OPTICAL SIGNALS

422 — GENERATE DOWN-CONVERTED RF OUTPUT SIGNAL USING BALANCED PHOTODETECTORS

END

FIG. 4

TUNABLE OPTICAL CARRIER-TO-SIDEBAND RATIO FILTERING AND DOWN-CONVERTING COHERENT RADIO FREQUENCY (RF) PHOTONIC LINK

TECHNICAL FIELD

This disclosure relates generally to electro-optical systems. More specifically, this disclosure relates to a tunable optical carrier-to-sideband ratio filtering and down-converting coherent radio frequency (RF) photonic link.

BACKGROUND

Frequency down-converters are ubiquitous in civilian and military systems. For example, radio frequency (RF) photonic systems can be used to down-convert RF signals. RF photonic systems promise improved instantaneous bandwidth, phase ripple, size, weight, power, and cost compared to all-electronic implementations. These metrics become more important and challenging to meet with electronic-based solutions as demand for bandwidth and frequency coverage continues to increase.

SUMMARY

This disclosure relates to a tunable optical carrier-to-sideband ratio filtering and down-converting coherent radio frequency (RF) photonic link.

In a first embodiment, a method includes generating first and second optical carrier signals having a specified frequency offset. The method also includes modulating an RF input signal onto a portion of the first optical carrier signal to generate modulated optical signals, where the modulated optical signals include the portion of the first optical carrier signal and sideband signals. The method further includes suppressing the portion of the first optical carrier signal in the modulated optical signals to generate carrier-suppressed single sideband signals. The method also includes optically filtering the carrier-suppressed single sideband signals to generate filtered carrier-suppressed single sideband signals. The method further includes combining the filtered carrier-suppressed single sideband signals with portions of the second optical carrier signal to generate frequency-converted optical signals. In addition, the method includes generating an output RF signal based on the frequency-converted optical signals. Each of the frequency-converted optical signals has an optical carrier-to-sideband ratio (OCSR) that is controllable.

In a second embodiment, an apparatus includes optical sources configured to generate first and second optical carrier signals having a specified frequency offset. The apparatus also includes a modulator configured to module an RF input signal onto portions of the first optical carrier signal to generate modulated optical signals, where the modulated optical signals include the portions of the first optical carrier signal and sideband signals. The apparatus further includes optical combiners configured to combine filtered carrier-suppressed single sideband signals with portions of the second optical carrier signal to generate frequency-converted optical signals. Each of the filtered carrier-suppressed single sideband signals includes a single one of the sideband signals without the portions of the first optical carrier signal. In addition, the apparatus includes photodetectors configured to generate an output RF signal based on the frequency-converted optical signals. Each of the frequency-converted optical signals has an OCSR that is controllable.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3A through 3J illustrate example signals in the system providing the tunable optical carrier-to-sideband ratio filtering and down-converting coherent RF photonic link of FIGS. 2A and 2B according to this disclosure; and FIG. 4 illustrates an example method for electro-optic modulation of an RF signal using a tunable optical carrier-to-sideband ratio filtering and down-converting coherent RF photonic link according to this disclosure.

DETAILED DESCRIPTION

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, frequency down-converters are ubiquitous in civilian and military systems. For example, radio frequency (RF) photonic systems can be used to down-convert RF signals. RF photonic systems promise improved instantaneous bandwidth, phase ripple, size, weight, power, and cost compared to all-electronic implementations. These metrics become more important and challenging to meet with electronic-based solutions as demand for bandwidth and frequency coverage continues to increase. Unfortunately, RF photonic down-converters can suffer from various problems. For instance, the capture of low-power broadband signals using RF photonics can be frustrated by a large system noise figure (NF), which can be attributed (among other things) to laser relative intensity noise (RIN) and modulator half-wave voltage ($V_{pi}$). Also, conventional RF photonic systems often attempt to capture extremely-large bandwidths, but doing so typically involves the use of electronic down-converting and filtering that increases size, weight, power, and cost of the overall system.

This disclosure provides a tunable optical carrier-to-sideband ratio filtering and down-converting coherent RF photonic link. As described in more detail below, a broadband RF photonic system is provided with integral baseband down-conversion and filtering that achieves a low noise figure. The integral baseband down-conversion and filtering can provide broadband system frequency coverage, which can be achieved using narrowband electronics to significantly alleviate the size, weight, power, and cost of backend electronics. The low noise figure can be achieved using a tunable optical carrier-to-sideband ratio for improved signal sensitivity and balanced detection that provides RIN cancellation. In some cases, the broadband RF photonic systems can be at least partially implemented using photonic integrated circuits, which can provide even better size, weight, power, and cost reductions.

Note that the broadband RF photonic systems described below can be used in a wide variety of applications. Example applications for the broadband RF photonic systems can include telecommunications, RF photonics, biology, cell sorting, spectroscopy, atomic physics, quantum optics, and precision navigation and timing. However, these applications are merely examples, and the broadband RF photonic systems may be used in any suitable manner and for any suitable purposes.

Figure 1:
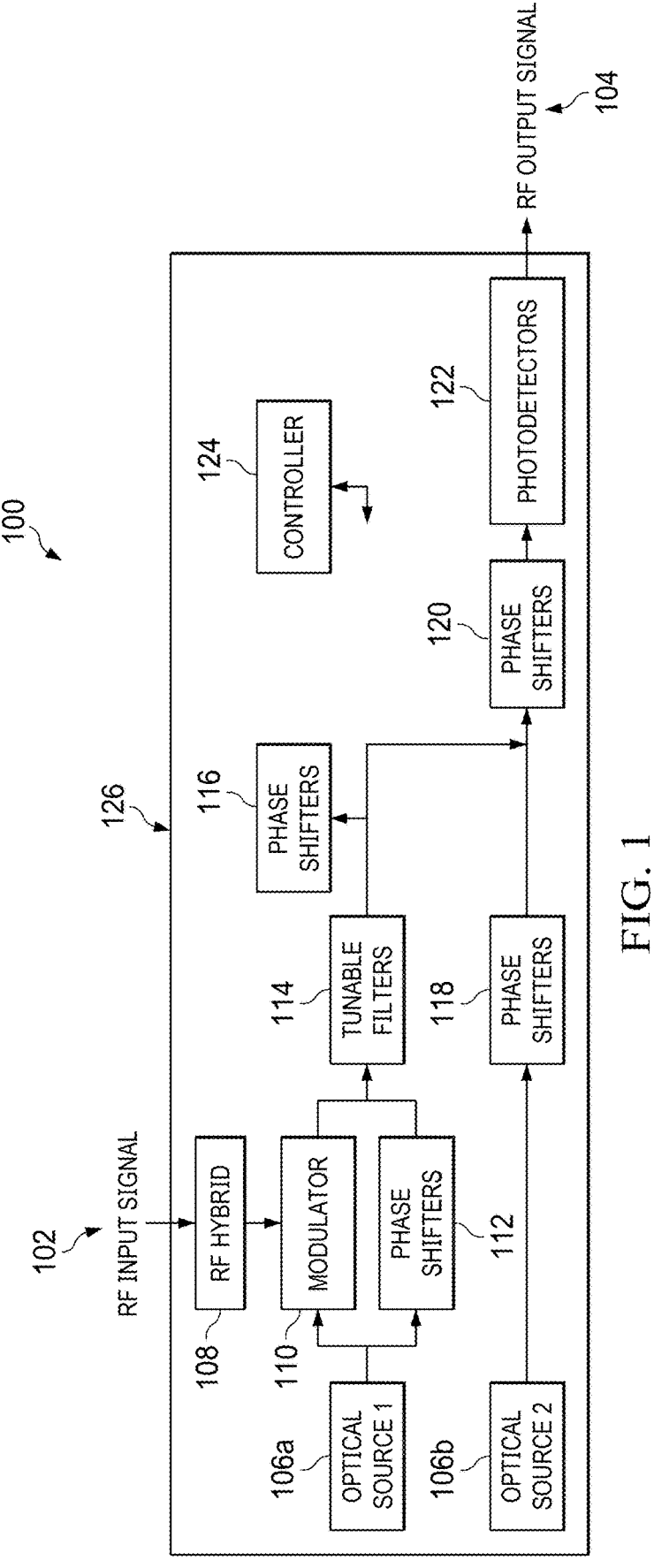
FIG. 1 illustrates an example system providing a tunable optical carrier-to-sideband ratio filtering and down-converting coherent radio frequency (RF) photonic link according to this disclosure.

FIG. 1 illustrates an example system 100 providing a tunable optical carrier-to-sideband ratio filtering and down-converting coherent RF photonic link according to this disclosure. As shown in FIG. 1, the system 100 is generally configured to receive an RF input signal 102 and use photonic techniques to filter and down-convert the RF input signal 102 in order to generate an RF output signal 104. The RF input signal 102 may be obtained from any suitable source or sources. In some cases, the RF input signal 102 can represent a wideband RF signal. The RF output signal 104 may be provided to any suitable destination or destinations. In some cases, the RF output signal 104 can be provided to processing circuitry or other circuitry for recovery of data contained in the RF output signal 104.

The system 100 also includes two optical sources 106a-106b, which can be used to generate optical signals (which may sometimes be referred to as carrier signals). The optical sources 106a-106b represent offset-locked tunable sources that can generate optical signals having a known frequency offset, meaning there is a desired difference in frequency between the optical signals. For example, the optical signal generated by the optical source 106b can be "blue shifted" relative to the optical signal generated by the optical source 106a, indicating that the optical signal generated by the optical source 106b has a higher frequency than the optical signal generated by the optical source 106a. This can also be expressed by saying that the optical signal generated by the optical source 106a is "red shifted" relative to the optical signal generated by the optical source 106b, indicating that the optical signal generated by the optical source 106a has a lower frequency than the optical signal generated by the optical source 106b. The optical signal generated by the optical source 106b can also have a lower or higher optical power than the optical signal generated by the optical source 106a.

In this example, the RF input signal 102 is provided to an RF hybrid element 108, which divides the RF input signal 102 into in-phase and quadrature components. For example, the RF hybrid element 108 can generate two versions of the RF input signal 102, where one version of the RF input signal 102 is 90° out-of-phase relative to the other version of the RF input signal 102. The outputs of the RF hybrid element 108 are provided to a modulator 110, which modulates the two versions of the RF input signal 102. The optical signal generated by the optical source 106a is divided (such as by using one or more optical splitters), and a portion of the optical signal generated by the optical source 106a is provided to the modulator 110. This means that the modulator 110 is driven at the frequency of the optical signal generated by the optical source 106a.

In some embodiments, the modulator 110 may represent a single sideband (SSB) modulator, and each output of the modulator 110 may include a lower-amplitude portion of the optical signal generated by the optical source 106a and a single sideband signal. As a particular example, the modulator 110 may represent a dual-output dual-drive Mach-Zehnder modulator (DD-MZM). In some embodiments, the modulator 110 can generate dual outputs to facilitate relative intensity noise cancellation, where each output contains a lower-amplitude portion of the optical signal generated by the optical source 106a and a single sideband signal. Thus, each output of the modulator 110 in these embodiments can be said to represent a single sideband signal. In other embodiments, the RF hybrid element 108 may be omitted, and the modulator 110 may represent a single-drive MZM (SD-MZM). In those embodiments, the modulator 110 can generate an output that includes a lower-amplitude portion of the optical signal generated by the optical source 106a and multiple sideband signals.

At least one other portion of the optical signal generated by the optical source 106a is provided to one or more phase shifters 112, each of which can shift the phase of its portion of the optical signal generated by the optical source 106a. For example, each phase shifter 112 may shift the phase of its portion of the optical signal generated by the optical source 106a by 180° without adjusting the amplitude of that portion of the optical signal (at least by any significant amount). The one or more resulting phase-shifted signals are combined (such as by using one or more optical combiners) with the one or more outputs of the modulator 110, which results in substantial or complete cancellation of the carrier signal so that primarily only the sideband signals generated by the modulator 110 are provided to tunable filters 114. In some embodiments, this results in the generation of one or more carrier-suppressed single sideband (CS-SSB) signals.

One or more tunable filters 114 filter the sideband signals and output selected portions of those sideband signals. For example, the one or more tunable filters 114 can be used to remove portions of the sideband signals so that only desired frequencies are output from the one or more tunable filters 114. This results in the generation of one or more filtered CS-SSB signals. Note that if the modulator 110 does not represent a single sideband modulator, the one or more tunable filters 114 can also be used to suppress one or more undesired sideband signals, such as a lower sideband signal, which again results in the generation of one or more filtered CS-SSB signals. When multiple tunable filters 114 are used, the tunable filters 114 can be adjusted so that they are substantially or completely frequency-matched to one another.

One or more phase shifters 116 are used to shift the phases of the filtered CS-SSB signals output from the one or more tunable filters 114, such as to realign the phases of the filtered CS-SSB signals. The re-aligned filtered CS-SSB signals can be combined (such as by using one or more optical combiners), and the resulting power of the combined optical signals can be used to adjust different tunable filters 114 until the resulting power of the combined optical signals is minimized. This helps to ensure that the different tunable filters 114 are substantially or completely frequency-matched to one another.

The optical signal generated by the optical source 106b is provided to one or more phase shifters 118, each of which can be used to adjust the phase of its portion of the optical signal generated by the optical source 106b. For example, the one or more phase shifters 118 can phase-shift one or more portions of the optical signal generated by the optical source 106b so as to be generally aligned with the phase(s) of the one or more filtered CS-SSB signals output from the tunable filter(s) 114. If necessary, multiple phase shifters 118 can also phase-shift multiple portions of the optical signal generated by the optical source 106*b* so that the different portions are correctly phased with respect to each other. The outputs of the tunable filter(s) 114 and the phase shifter(s) 118 are combined (such as by using one or more optical combiners) to generate one or more frequency-converted optical signals, which helps to support coherent detection of the RF input signal 102. If multiple frequency-converted optical signals are generated here, they may be out-of-phase relative to each other, and the frequency-converted optical signals can be provided to phase shifters 120 that align the frequency-converted optical signals. The frequency-converted optical signal(s) can be provided to one or more photodetectors 122, which are used to generate the RF output signal 104.

A controller 124 can be used here to control various operations of the system 100. For example, the controller 124 can adjust operation of the phase shifter(s) 112 to ensure that the optical signal generated by the optical source 106*a* is substantially or completely cancelled from the optical signal(s) output from the tunable filter(s) 114 (and possibly from the optical signal(s) provided to the tunable filter(s) 114). The controller 124 can also adjust the tunable filter(s) 114 in order to minimize the power of the signal(s) generated by the phase shifter(s) 116.

Each optical source 106*a*-106*b* includes any suitable structure configured to generate optical energy. In some cases, the optical sources 106*a*-106*b* represent lasers, such as diode lasers. The RF hybrid element 108 includes any suitable structure configured to generate in-phase and quadrature components of an RF signal, such as a 90° coupler. The modulator 110 includes any suitable structure configured to perform optical modulation, such as a DD-MZM, an SD-MZM, an in-phase/quadrature (I/Q) MZM, or a double-nested MZM. Each phase shifter 112, 116, 118, 120 includes any suitable structure configured to alter the phase of an optical signal, such as a resonant micro-ring modulator, a thermal modulator, an electro-optic (E/O) modulator, or a PN junction micro-ring modulator. Each tunable filter 114 includes any suitable structure configured to selectively filter optical signals, such as a tunable bandpass filter. Each photodetector 122 includes any suitable structure configured to detect optical energy, such as a photodiode. The controller 124 includes any suitable structure configured to control one or more operations of the system 100, such as at least one microprocessor, microcontroller, digital signal processor (DSP), application-specific integrated circuit (ASIC), field-programmable gate array (FPGA), or discrete circuitry.

In some embodiments, some or all of the components of the system 100 may be fabricated using at least one photonic integrated circuit (PIC) 126. Each photonic integrated circuit 126 generally represents a device that integrates multiple photonic or light-based functions into a common structure. In some cases, the photonic integrated circuit(s) 126 may include all of the components of the system 100 shown in FIG. 1. In other cases, the photonic integrated circuit(s) 126 may include any suitable subset of the components of the system 100 shown in FIG. 1. The ability to implement at least part of the system 100 using at least one photonic integrated circuit 126 can enable a number of functions, such as on-chip photodiode telemetry and signal control, and can enable environmentally-rugged control and operation in harsh environments.

The system 100 shown in FIG. 1 is able to combine a number of optical-related functions in order to provide effective down-conversion of the RF input signal 102. For example, the system 100 can support a tunable optical carrier-to-sideband ratio (OCSR), which can be achieved by controlling various components to effectively convert the RF input signal 102 into single sideband signals having a controllable OCSR. The system 100 can also support dual-laser or other multi-optical source down-conversion, which can be achieved using the various optical beams from the optical sources 106*a*-106*b*. The system 100 can further support coherent detection to suppress or cancel the relative intensity noise of the optical sources 106*a*-106*b*, which can be achieved based on how the RF input signal 102 is processed in conjunction with the optical signals from the optical sources 106*a*-106*b*. In addition, the system 100 can support signal filtering and/or RF phase shifting, which can be achieved using various components integrated into the system 100. As a result, the system 100 represents a compact package that can be used to more effectively capture and down-convert RF signals.

Although FIG. 1 illustrates one example of a system 100 providing a tunable optical carrier-to-sideband ratio filtering and down-converting coherent RF photonic link, various changes may be made to FIG. 1. For example, components can be added, omitted, combined, further subdivided, replicated, or placed in any other suitable configuration in FIG. 1 according to particular needs.

Figure 2A:
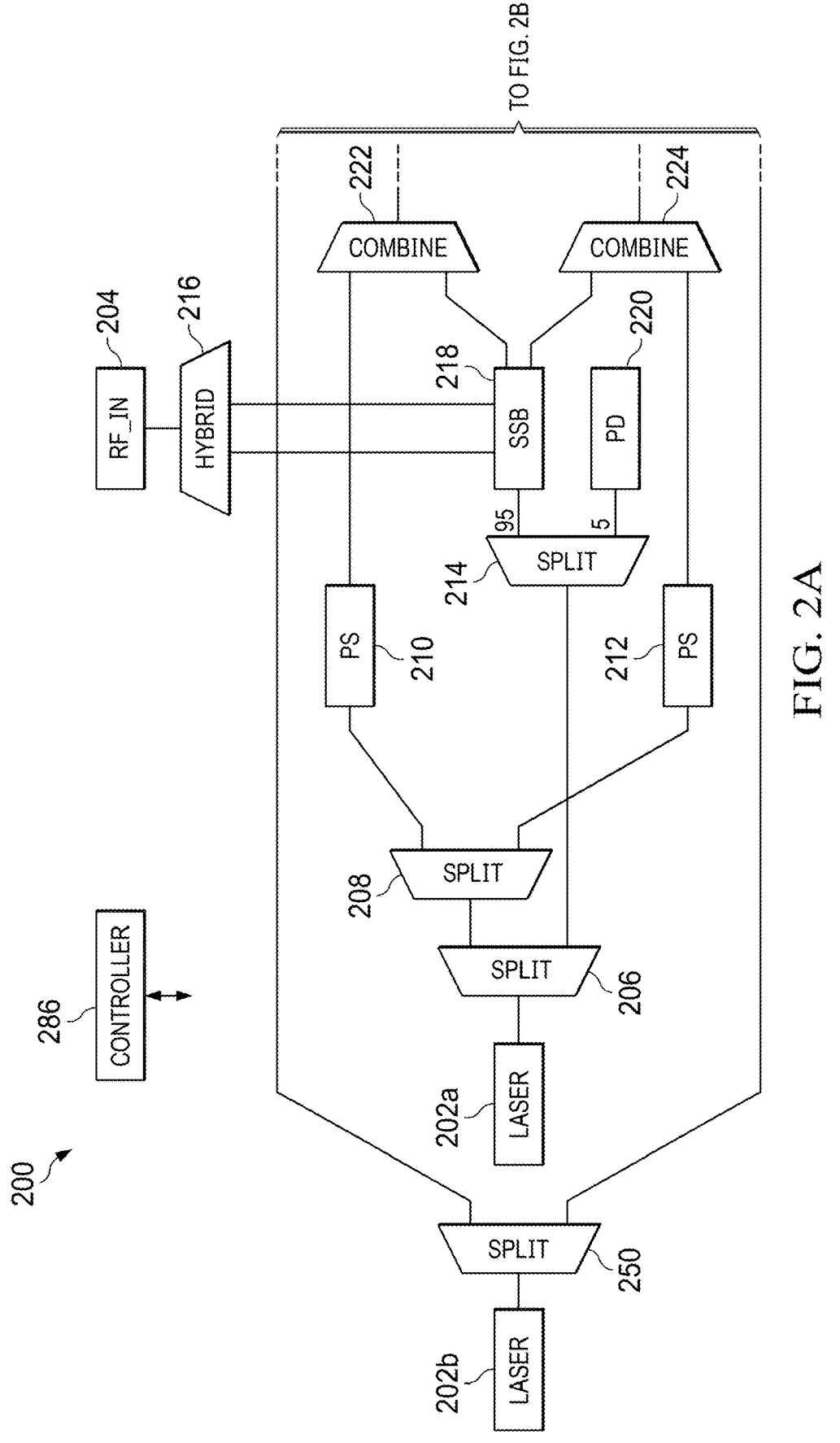
FIGS. 2A and 2B illustrate a more specific example system providing a tunable optical carrier-to-sideband ratio filtering and down-converting coherent radio frequency (RF) photonic link according to this disclosure.
Figure 2B:
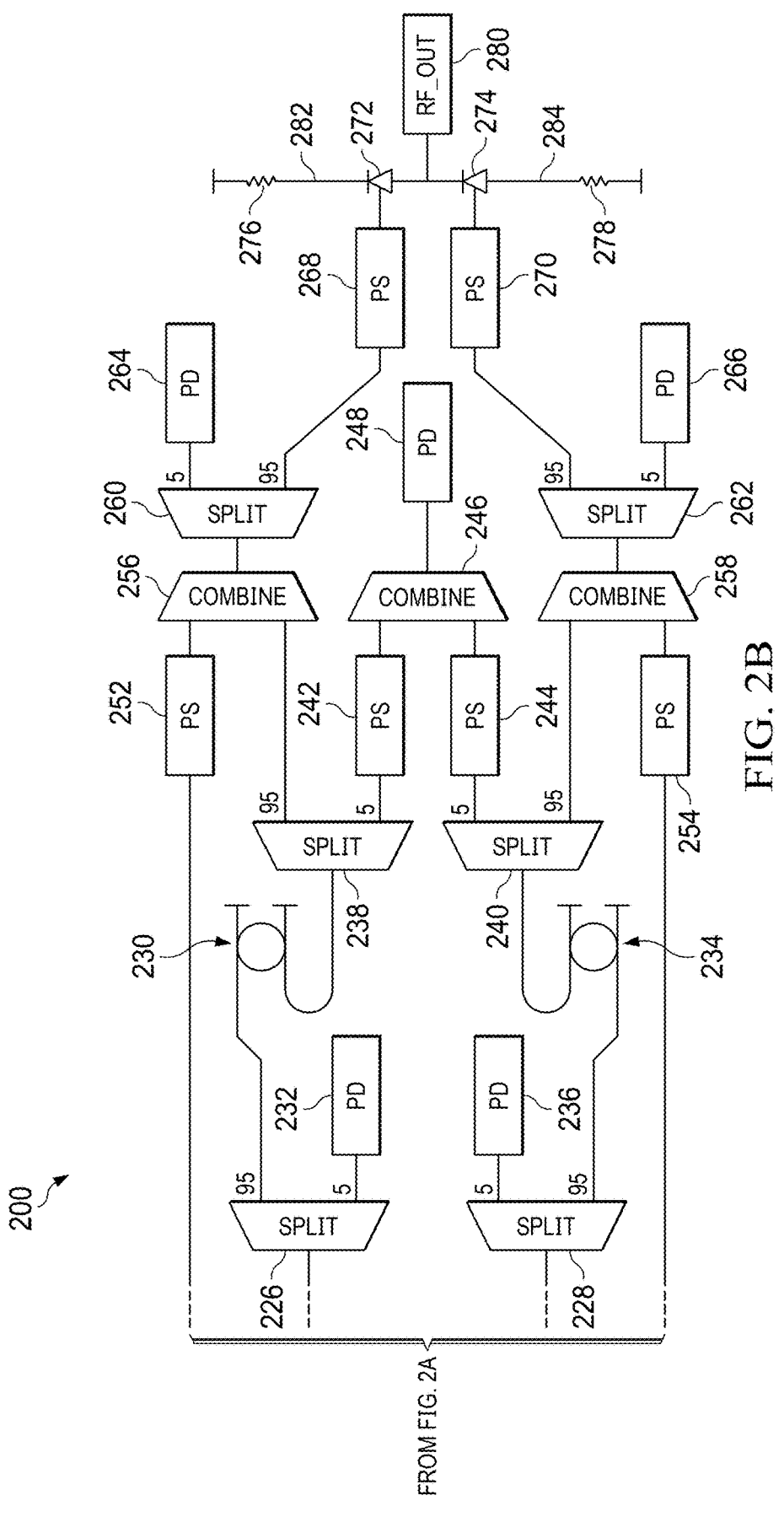

FIGS. 2A and 2B illustrate a more specific example system 200 providing a tunable optical carrier-to-sideband ratio filtering and down-converting coherent RF photonic link according to this disclosure. More specifically, the system 200 shown in FIGS. 2A and 2B represents a specific implementation of the system 100 shown in FIG. 1. FIGS. 3A through 3J illustrate example signals in the system 200 providing the tunable optical carrier-to-sideband ratio filtering and down-converting coherent RF photonic link of FIGS. 2A and 2B according to this disclosure. More specifically, FIGS. 3A through 3J provide examples of signals that may be received and/or generated by various components of the system 200 shown in FIGS. 2A and 2B. The example signals shown in FIGS. 3A through 3J are described below in conjunction with the components of the system 200 that receive or generate those signals.

As shown in FIGS. 2A-2B and FIGS. 3A-3B, the system 200 includes a first laser 202*a* and a second laser 202*b*, where (i) the laser 202*a* is configured to generate an optical signal 302 and (ii) the laser 202*b* is configured to generate an optical signal 304. These optical signals 302-304 may sometimes be referred to as carrier signals. The lasers 202*a*-202*b* represent offset-locked tunable lasers that generate the optical signals 302-304 having a desired frequency offset. The optical signal 304 can have a higher frequency relative to the optical signal 302, and the optical signal 304 can have a lower power relative to the optical signal 302. These features are illustrated in FIGS. 3A-3B, where a dashed line represents the optical signal 304 in FIG. 3A and a dashed line represents the optical signal 302 in FIG. 3B. As shown here, the optical signal 302 has a lower frequency and a higher amplitude compared to the optical signal 304.

As shown in FIGS. 2A-2B and FIG. 3C, the system 200 also includes an RF input port 204, which is configured to receive an RF input signal 306. As can be seen in FIG. 3C, the RF input signal 306 represents an electromagnetic signal in the RF domain, meaning its frequency or frequencies are below optical frequencies. In some cases, the RF input signal 306 can represent a wideband RF signal.

Figures 3D, 3E:
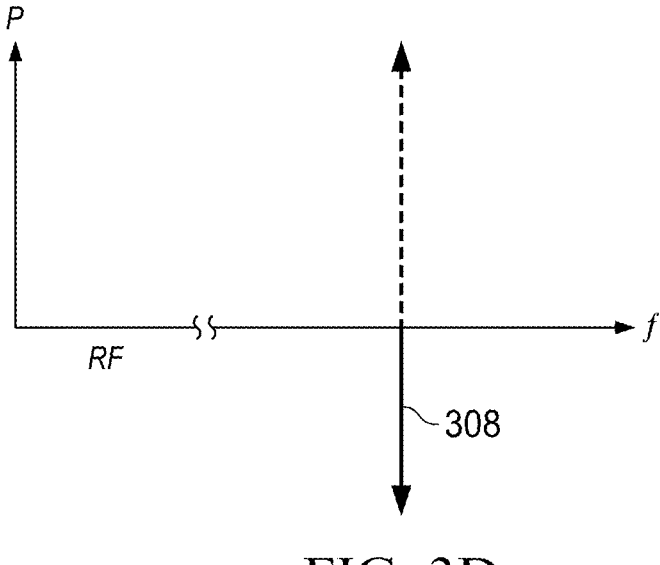

The optical signal 302 generated by the laser 202*a* is split using a splitter 206. In some embodiments, the splitter 206 can be a tunable power splitter. One portion of the optical signal 302 from the splitter 206 is again split using a splitter 208. In some embodiments, the splitter 208 can be a tunable power splitter. One portion of the optical signal 302 from the splitter 208 is provided to a phase shifter (PS) 210, and another portion of the optical signal 302 from the splitter 208 is provided to a phase shifter 212. Each phase shifter 210-212 is configured to shift the phase of its respective portion of the optical signal 302. For example, the phase shifter 210 can shift the phase of its portion of the optical signal 302 by 180° without adjusting the amplitude of that portion of the optical signal 302 (at least by any significant amount), and the phase shifter 212 can shift the phase of its portion of the optical signal 302 by 180° without adjusting the amplitude of that portion of the optical signal 302 (at least by any significant amount). As shown in FIG. 3D, each phase shifter 210-212 may generate an optical signal 308, which is at the same frequency and equal amplitude as its portion of the optical signal 302, but with opposite phase. In some embodiments, the amplitude of each optical signal 308 can be controlled using the tunable splitters 206-208. In other embodiments, the amplitude of each optical signal 308 can be controlled by adjusting the power of the laser 202a and using a tunable splitter as the splitter 206.

Another portion of the optical signal 302 from the splitter 206 is again split using a splitter 214. The splitter 214 can be used to split this portion of the optical signal 302 from the splitter 206 into a larger portion and a smaller portion, such as one portion that contains about 95% of the optical energy and another portion that contains about 5% of the optical energy. Note, however, that other proportions of power splitting can also be used. To enable dither-free modulator bias keeping, a photodetector (PD) 220 can be used to measure the intensity of the smaller portion of the optical signal provided by the splitter 214.

The RF input signal 306 received via the RF input port 204 is provided to an RF hybrid element 216, which generates two versions of the RF input signal 306. One version of the RF input signal 306 is 90° out-of-phase relative to the other version of the RF input signal 306. The outputs of the RF hybrid element 216 are provided to an SSB modulator 218, which modulates the two versions of the RF input signal 306 based on the larger portion of the optical signal 302 provided by the splitter 214. As a result, the SSB modulator 218 is driven at the frequency of the optical signal 302 generated by the laser 202a.

The SSB modulator 218 generates two outputs, each of which may be referred to as a modulated optical signal and may have the form shown in FIG. 3E. For each output, the SSB modulator 218 provides a smaller portion 310 of the optical signal 302 along with a single sideband signal 312. A dashed sideband signal 314 in FIG. 3E represents another sideband signal that has been suppressed by the SSB modulator 218. In this example, the single sideband signal 312 represents an upper sideband having a higher frequency than the optical signal 302 generated by the laser 202a. This type of signaling can be generated for both outputs of the SSB modulator 218, which are based on the two versions of the RF input signal 306 generated by the RF hybrid element 216.

A combiner 222 is used to combine the optical signals 310-312 in FIG. 3E provided at the first output of the SSB modulator 218 with the phase-shifted optical signal 308 in FIG. 3D provided by the phase shifter 210. As noted earlier, the laser 202a, the splitter 206, the splitter 208, and the phase shifter 210 can be used to generate an equal amplitude phase-shifted optical signal 308 by shifting a portion of the optical signal 302 by 180°. Similarly, a combiner 224 is used to combine the optical signals 310-312 provided at the second output of the SSB modulator 218 with the phase-shifted optical signal 308 provided by the phase shifter 212. Again, the laser 202a, the splitter 206, the splitter 208, and the phase shifter 212 can be used to generate an equal amplitude phase-shifted optical signal 308 by shifting a portion of the optical signal 302 by 180°. This results in substantial or complete cancellation of the carrier frequency of the optical signal 302 from the combined optical signals generated by the combiners 222-224, such as via destructive interference. As shown in FIG. 3F, each combiner 222-224 may therefore output substantially only its single sideband signal 312. As a result, the combiners 222-224 can be used here to respectively generate first and second CS-SSB signals.

The first CS-SSB signal is provided to a splitter 226, and the second CS-SSB signal is provided to a splitter 228. The splitter 226 can be used to split the first CS-SSB signal into a larger portion and a smaller portion, such as one portion that contains about 95% of the optical energy and another portion that contains about 5% of the optical energy. The splitter 228 can be used to split the second CS-SSB signal into a larger portion and a smaller portion, such as one portion that contains about 95% of the optical energy and another portion that contains about 5% of the optical energy. Note, however, that other proportions of power splitting can also be used.

The larger portion of the first CS-SSB signal is provided to a tunable filter 230, and the smaller portion of the first CS-SSB signal is provided to a photodetector 232. Similarly, the larger portion of the second CS-SSB signal is provided to a tunable filter 234, and the smaller portion of the second CS-SSB signal is provided to a photodetector 236. The tunable filters 230 and 234 filter the larger portions of their respective CS-SSB signals in order to isolate certain frequencies of the CS-SSB signals and block other frequencies of the CS-SSB signals. As shown in FIG. 3G, the tunable filters 230 and 234 filter the larger portions of their respective CS-SSB signals to generate filtered CS-SSB signals 316, which have narrower frequency ranges than the associated CS-SSB signals. The photodetectors 232 and 236 can be used to measure the intensities of the smaller portions of the first and second CS-SSB signals provided by the splitters 226-228. When the intensities measured by the photodetectors 232 and 236 are minimized, the carrier suppression is maximized. Therefore, the laser 202a, splitters 206-208, and phase shifters 210-212 may each be optimized to minimize the optical power detected by the photodetectors 232 and 236.

The first filtered CS-SSB signal 316 from the tunable filter 230 is provided to a splitter 238, and the second filtered CS-SSB signal 316 from the tunable filter 234 is provided to a splitter 240. The splitter 238 can be used to split the first filtered CS-SSB signal 316 into a larger portion and a smaller portion, such as one portion that contains about 95% of the optical energy and another portion that contains about 5% of the optical energy. The splitter 240 can be used to split the second filtered CS-SSB signal 316 into a larger portion and a smaller portion, such as one portion that contains about 95% of the optical energy and another portion that contains about 5% of the optical energy. Note, however, that other proportions of power splitting can also be used.

The smaller portion of the first filtered CS-SSB signal 316 from the splitter 238 is provided to a phase shifter 242, and the smaller portion of the second filtered CS-SSB signal 316 from the splitter 240 is provided to a phase shifter 244. The phase shifters 242-244 can adjust the phases of the smaller portions of the filtered CS-SSB signals 316 to substantially or completely align their phases with a 180° phase shift. The tunable filters 230 and 234 can adjust the spectra of the smaller portions of the filtered CS-SSB signals 316 to substantially or completely align their spectra. A combiner 246 can combine the substantially or completely phase- and spectrally-matched smaller portions of the filtered CS-SSB signals 316. A photodetector 248 can be used to measure the intensity of the resulting combined optical signal. By optimizing control inputs to the tunable filters 230 and 234 and the phase shifters 242-244, the power detected by the photodetector 248 can be minimized, and the tunable filters 230 and 234 can be frequency-matched.

The optical signal 304 generated by the laser 202b is split using a splitter 250, where the power from the laser 202b can be controlled. As shown in FIG. 3H, each portion 318 of the optical signal 304 can have a smaller or larger amplitude than the optical signal 304. One portion 318 of the optical signal 304 is provided to a phase shifter 252, and another portion 318 of the optical signal 304 is provided to a phase shifter 254.

Figure 3I:
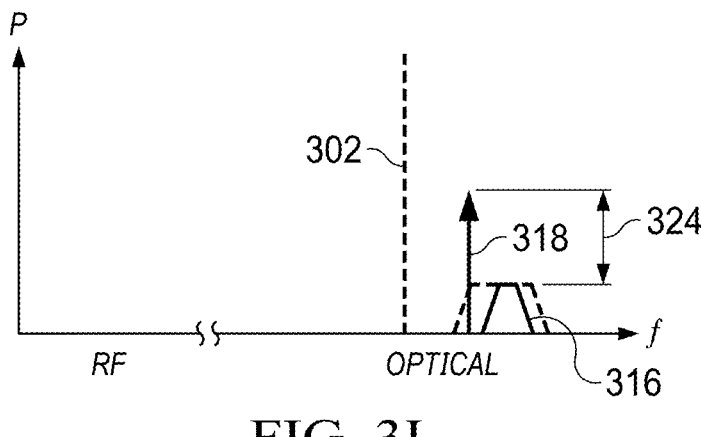

A combiner 256 combines the carrier injection optical signal from the phase shifter 252 and the filtered carrier-suppressed single-sideband signal from the splitter 238. Similarly, a combiner 258 combines the carrier injection optical signal from the phase shifter 254 and the filtered carrier-suppressed single-sideband signal from the splitter 240. As shown in FIG. 3I, each combiner 256-258 outputs its associated injected carrier portion of the optical signal 318 and its associated filtered CS-SSB signal 316. The frequency separation between the injected carrier signal 316 and the filtered CS-SSB signal 316 is reduced when compared with the separation between the suppressed carrier signal 302 and the CS-SSB signal 316, thus accomplishing frequency down-conversion. Each combiner 256-258 outputs a down-converted sideband signal with a tunable increased optical carrier-to-sideband ratio (OCSR), which can also result in a reduced effective $V_{pi}$ and a reduced noise figure.

The output of the combiner 256 is provided to a splitter 260, and the output of the combiner 258 is provided to a splitter 262. The splitter 260 can be used to split the output the combiner 256 into a larger portion and a smaller portion, such as one portion that contains about 95% of the optical energy and another portion that contains about 5% of the optical energy. The splitter 262 can be used to split the output from the combiner 258 into a larger portion and a smaller portion, such as one portion that contains about 95% of the optical energy and another portion that contains about 5% of the optical energy. Note, however, that other proportions of power splitting can also be used.

The smaller portions of the outputs of the combiners 256-258 are provided from the splitters 260-262 to photodetectors 264-266, respectively. The larger portions of the outputs of the combiners 256-258 are provided from the splitters 260-262 to phase shifters 268-270, respectively. The photodetectors 264-266 are used to measure the carrier and sideband power. In this example, the photodetectors 232 and 236 are used to measure the unfiltered sideband power. An estimate of the OCSR can be made by comparing the optical powers detected by the photodetectors 232 and 264. Similarly, an estimate of the OCSR can be made by comparing the optical powers detected by the photodetectors 236 and 266. In some cases, the OCSR estimate(s) can be utilized to implement automatic gain control.

Figure 3J:
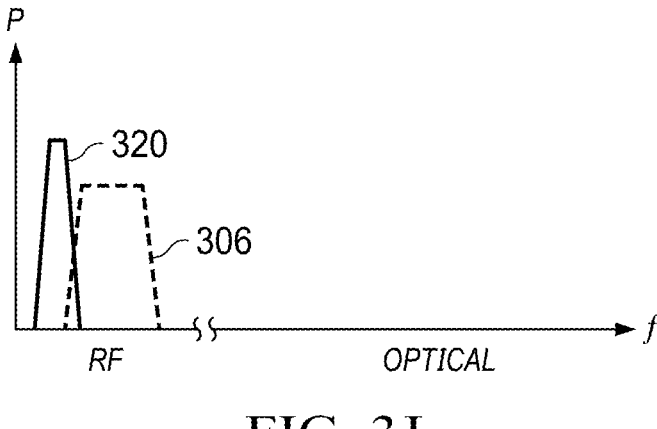

The phase shifters 268-270 operate to substantially or completely align the phases of their inputs, and the resulting phase-aligned versions of the optical signals in the two paths are used to drive two photodetectors 272-274. Each of the photodetectors 272-274 generates an electrical current based on the amount of electromagnetic energy received by that photodetector 272-274. The photodetectors 272-274 are coupled in series with one another and with resistors 276-278 in a monitored balanced detector configuration. This configuration simultaneously suppresses common mode noise originating from the relative intensity noise in the lasers 202a-202b. The phase shifters 252-254 and 268-270 here can be tuned to maximize common mode rejection based on measured values at monitor locations 282-284. Operation of the photodetectors 272-274 leads to the generation of a varying electrical signal between the photodetectors 272-274. As shown in FIG. 3J, this varying electrical signal represents an RF output signal 320, which is a filtered, down-converted, and amplified version of the RF input signal 306. The RF output signal 320 can be provided via an RF output port 280.

Note that the portions 318 of the optical signal 304 from the laser 202b can be used here to increase the photocurrents generated by the photodetectors 272-274, which can help to provide favorable RF gain and a lower noise figure during RIN-cancelling balanced detection. Also note the difference between the OCSR 322 in FIG. 3E and the OCSR 324 in FIG. 3I. This indicates that the optical carrier-to-sideband ratio has been reduced, which increases modulation depth. Increasing the modulation depth can be used to increase RF link gain and reduce the noise figure. Reducing the $V_{pi}$ of the modulator 218 can also reduce the optical carrier-to-sideband ratio. Further, note that by using the two photodetectors 272-274, balanced photodetection is provided, which can be used to support laser RIN cancellation and further reduce the noise figure. In addition, providing a tunable optical carrier-to-sideband ratio can help to improve RF gain, which can have various advantages over intrinsic reductions to the modulator's $V_{pi}$. For instance, a tunable optical carrier-to-sideband ratio can be used for automatic gain control to improve specific weak signal sensitivity while preventing strong signal distortion.

A controller 286 can be used to control various operations in the system 200. For example, the controller 286 may be configured to receive various inputs, such as measurements captured using the photodetectors 220, 232, 236, 248, 264, 266, 272, 274 282, 284. Based on those measurements, the controller 286 may adjust the operation of various splitters 206, 208, 250, tunable filters 230, 234, and/or phase shifters 210, 212, 242, 244, 252, 254, 268, 270 in order to effectively down-convert the RF input signal 306 and generate the RF output signal 320.

As a particular example, the controller 286 can control the power of the laser 202a, the split ratios of the splitters 206-208, and the phase shifting by the phase shifter 210 so that the frequency of the optical signal 302 is effectively suppressed when signals are combined using the combiner 222. This control can be performed while trying to minimize the power of the optical signal 302 as detected by the photodetector 232. Similarly, the controller 286 can control the power of the laser 202a, the split ratios of the splitters 206-208, and the phase shifting by the phase shifter 212 so that the frequency of the optical signal 302 is effectively suppressed when signals are combined using the combiner 224. This control can be performed while trying to minimize the power of the optical signal 302 as detected by the photodetector 236. As another example, the tunable filters 230 and 234 can be adjusted by the controller 286 until the tunable filters 230 and 234 are substantially or completely frequency-matched. This control can be performed by minimizing the optical power that is sensed by the photodetector 248 and received via the phase shifters 242-244 and the combiner 246. As yet another example, the controller 286 can control various components so that measurements from the photodetectors 264, 266 are substantially or completely equal or so that measurements from the photodetectors 232, 236, 264-266 to generate OCSR estimates.

Each laser 202a-202b includes any suitable structure configured to generate laser illumination, such as a diode laser. Each port 204, 280 includes any suitable structure configured to receive or provide an RF signal. Each splitter 206, 208, 250 includes any suitable structure configured to controllably split an optical signal, such as a tunable coupler or other tunable optical power splitter. Each splitter 214, 226, 228, 238, 240, 260, 262 includes any suitable structure configured to split an optical signal in a specified manner, such as a fixed coupler or other optical power splitter. Each phase shifter 210, 212, 242, 244, 252, 254, 268, 270 includes any suitable structure configured to alter the phase of an optical signal, such as a resonant micro-ring modulator, a thermal modulator, an E/O modulator, or a PN junction micro-ring modulator. The RF hybrid element 216 includes any suitable structure configured to generate in-phase and quadrature components of an RF signal, such as a 90° coupler. The modulator 218 includes any suitable structure configured to perform optical modulation, such as a DD-MZM. Each photodetector 220, 232, 236, 248, 264, 266, 272, 274 282, 284 includes any suitable structure configured to detect optical energy, such as a photodiode. Each combiner 222, 224, 246, 256, 258 includes any suitable structure configured to perform optical combination, such as a waveguide. Each tunable filter 230, 234 includes any suitable structure configured to controllably filter optical signals, such as a controllable optical bandpass filter. Each resistor 276, 278 includes any suitable resistive structure providing any suitable resistance. The controller 286 includes any suitable structure configured to control one or more operations of the system 200, such as at least one microprocessor, microcontroller, DSP, ASIC, FPGA, or discrete circuitry.

As with the system 100, in some embodiments, some or all of the components of the system 200 may be fabricated using at least one photonic integrated circuit. In some cases, the photonic integrated circuit(s) may include all of the components of the system 200 shown in FIGS. 2A and 2B. In other cases, the photonic integrated circuit(s) may include any suitable subset of the components of the system 200 shown in FIGS. 2A and 2B. Again, the ability to implement at least part of the system 200 using at least one photonic integrated circuit can enable a number of functions, such as on-chip photodiode telemetry and signal control, and can enable environmentally-rugged control and operation in harsh environments.

Although FIGS. 2A and 2B illustrates one more specific example of a system 200 providing a tunable optical carrier-to-sideband ratio filtering and down-converting coherent RF photonic link, various changes may be made to FIGS. 2A and 2B. For example, components can be added, omitted, combined, further subdivided, replicated, or placed in any other suitable configuration in FIGS. 2A and 2B according to particular needs. As a particular example, as with the system 100 of FIG. 1, the RF hybrid element 216 may be omitted, and the SSB modulator 218 may be implemented using an SD-MZM or other non-SSB type of modulator. In these cases, the tunable filters 230 and 234 may be used to perform CS-SSB modulation and RF filtering in order to generate filtered CS-SSB signals. As another particular example, the system 200 uses a large number of splitters, photodetectors, and other components to monitor and control how the system 200 is operating and to make adjustments to various components of the system 200. However, this type of control structure is an example only, and the components of the system 200 used to generate the down-converted RF output signal 320 can be controlled in any other suitable manner. Thus, for instance, various photodetectors and the splitters used to feed the photodetectors may be omitted.

FIG. 4 illustrates an example method 400 for electro-optic modulation of an RF signal using a tunable optical carrier-to-sideband ratio filtering and down-converting coherent RF photonic link according to this disclosure. For ease of explanation, the method 400 is described as being performed using the system 200 shown in FIGS. 2A and 2B. However, the method 400 may be performed using any other suitable system(s), such as the system 100 shown in FIG. 1.

As shown in FIG. 4, first and second optical carrier signals are generated at step 402, and an RF input signal is received at step 404. This may include, for example, the lasers 202a-202b generating the first and second optical signals 302-304 having a known frequency offset. This may also include the RF input port 204 receiving the RF input signal 306. The RF input signal is modulated onto the first optical carrier signal at step 406. This may include, for example, the modulator 218 modulating the RF input signal 306 (possibly as modified by the RF hybrid element 216) onto a portion of the optical signal 302 to generate modulated optical signals. Single sideband signals are generated based on the modulated first optical carrier signal at step 408, and the carrier is suppressed using a portion of the first optical carrier signal and phase shifters at step 410. This may include, for example, the modulator 218 generating signals that include sidebands and portions of the optical signal 302. This may also include the combiners 222-224 combining those signals with signals generated by the phase shifters 210-212 to suppress the portions of the optical signal 302. If needed, the tunable filters 230, 234 may remove any undesired sideband signals 314 (if they are present in the outputs of the modulator 218). This leads to the generation of CS-SSB signals containing substantially only the sideband signals 312.

Tunable filters are used to generate filtered CS-SSB signals at step 412. This may include, for example, the tunable filters 230, 234 filtering the CS-SSB signals in order to generate filtered CS-SSB signals 316. The filtered CS-SSB signals are combined with portions of the second optical carrier signal to generate frequency-converted optical signals at step 414. This may include, for example, the combiners 256-258 combining the filtered CS-SSB signals 316 with portions 318 of the optical signal 304. Note that controlling the amplitudes of the portions 318 of the optical signal 304, it is possible to achieve a tunable optical carrier-to-sideband ratio as described above. A desired OCSR can be set using telemetry photodiodes, tunable couplers, and laser or other optical source power control at step 416. This may include, for example, the controller 124, 286 using various measurements from photodiodes and measured values at monitor locations 282-284 to control various splitters 206, 208, 250, the optical powers provided by the lasers 202a-202b, or other components of the system 100, 200. The phases and resonator frequencies of the frequency-converted optical signals are substantially or completely aligned at step 418. This may include, for example, the phase shifters 268-270 aligning the phases of the frequency-converted optical signals.

Balanced photodetectors are driven using the aligned frequency-converted optical signals at step 420, and an RF output signal is generated using the balanced photodetectors at step 422. This may include, for example, the photodetectors 272-274 collectively generating an electrical current based on the aligned filtered CS-SSB signals 316 and the portions 318 of the optical signal 304. This may also include the electrical current forming a voltage between the photodetectors 272-274, which can be output as the RF output signal 320. This approach therefore supports dual-laser down-conversion of the RF input signal 306, as well as coherent detection. In addition, signal filtering can be achieved using the tunable filters 230 and 234, and RF phase shifting can be supported using various phase shifters in the system 200.

Although FIG. 4 illustrates one example of a method 400 for electro-optic modulation of an RF signal using a tunable optical carrier-to-sideband ratio filtering and down-converting coherent RF photonic link, various changes may be made to FIG. 4. For example, while shown as a series of steps, various steps in FIG. 4 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating first and second optical carrier signals having a specified frequency offset;
modulating a radio frequency (RF) input signal onto a portion of the first optical carrier signal to generate modulated optical signals, the modulated optical signals comprising the portion of the first optical carrier signal and sideband signals;
suppressing the portion of the first optical carrier signal in the modulated optical signals to generate carrier-suppressed single sideband signals;
optically filtering the carrier-suppressed single sideband signals to generate filtered carrier-suppressed single sideband signals;
combining the filtered carrier-suppressed single sideband signals with portions of the second optical carrier signal to generate frequency-converted optical signals; and
generating an output RF signal based on the frequency-converted optical signals;
wherein each of the frequency-converted optical signals has an optical carrier-to-sideband ratio (OCSR) that is controllable.

2. The method of claim 1, wherein:
the sideband signals are generated using a modulator driven at a frequency of the first optical carrier signal; and
combining the filtered carrier-suppressed single sideband signals with the portions of the second optical carrier signal supports coherent detection.

3. The method of claim 1, wherein optically filtering the carrier-suppressed single sideband signals comprises optically filtering the carrier-suppressed single sideband signals using tunable filters that are frequency-matched to one another.

4. The method of claim 3, further comprising:
controlling the tunable filters by minimizing power contained in a combination of a portion of a first of the filtered carrier-suppressed single sideband signals and a portion of a second of the filtered carrier-suppressed single sideband signals.

5. The method of claim 1, further comprising at least one of:
shifting phases of additional portions of the first optical carrier signal, wherein resulting phase-shifted additional portions of the first optical carrier signal are combined with the modulated optical signals to suppress the portions of the first optical carrier signal in the modulated optical signals;

shifting phases of the portions of the second optical carrier signal prior to combining with the filtered carrier-suppressed single sideband signals; or shifting phases of the frequency-converted optical signals.

6. The method of claim 1, wherein generating the output RF signal comprises generating the output RF signal using first and second balanced photodetectors, different ones of the photodetectors driven by different ones of the frequency-converted optical signals.

7. The method of claim 1, further comprising:

generating in-phase and quadrature components of the RF input signal;

wherein the in-phase and quadrature components are modulated onto the portion of the first optical carrier signal.

8. The method of claim 1, further comprising:

controlling one or more splitters that generate additional portions of the first optical carrier signal and phase shifters that shift phases of the additional portions of the first optical carrier signal;

wherein resulting phase-shifted additional portions of the first optical carrier signal are combined with the modulated optical signals to suppress the portion of the first optical carrier signal in the modulated optical signals.

9. The method of claim 1, wherein the OCSR of each of the frequency-converted optical signals is tunable by adjusting an amplitude of one of the portions of the second optical carrier signal relative to an amplitude of one of the filtered carrier-suppressed single sideband signals.

10. The method of claim 1, wherein at least one of the modulating of the RF input signal, the suppressing of the portions of the first optical carrier signal, or the combining of the filtered carrier-suppressed single sideband signals occurs using at least one photonic integrated circuit.

11. An apparatus comprising:

optical sources configured to generate first and second optical carrier signals having a specified frequency offset;

a modulator configured to module a radio frequency (RF) input signal onto portions of the first optical carrier signal to generate modulated optical signals, the modulated optical signals comprising the portions of the first optical carrier signal and sideband signals;

optical combiners configured to combine filtered carrier-suppressed single sideband signals with portions of the second optical carrier signal to generate frequency-converted optical signals, wherein each of the filtered carrier-suppressed single sideband signals includes a single one of the sideband signals without the portions of the first optical carrier signal; and photodetectors configured to generate an output RF signal based on the frequency-converted optical signals;

wherein each of the frequency-converted optical signals has an optical carrier-to-sideband ratio (OCSR) that is controllable.

12. The apparatus of claim 11, further comprising:

one or more splitters configured to generate additional portions of the first optical carrier signal;

phase shifters configured to shift phases of the additional portions of the first optical carrier signal; and additional optical combiners configured to combine resulting phase-shifted additional portions of the first optical carrier signal with the modulated optical signals to suppress the portion of the first optical carrier signal in the modulated optical signals.

13. The apparatus of claim 11, further comprising:

tunable filters configured to suppress some of the sideband signals in the modulated optical signals and generate the filtered carrier-suppressed single sideband signals.

14. The apparatus of claim 11, further comprising:

tunable filters configured to generate the filtered carrier-suppressed single sideband signals, wherein the tunable filters are configured to be tuned and frequency-matched to one another.

15. The apparatus of claim 14, further comprising:

a controller configured to control the tunable filters in order to minimize power contained in a combination of a portion of a first of the filtered carrier-suppressed single sideband signals and a portion of a second of the filtered carrier-suppressed single sideband signals.

16. The apparatus of claim 11, wherein:

the modulator is configured to be driven at a frequency of the first optical carrier signal; and the apparatus supports coherent detection of the RF input signal.

17. The apparatus of claim 11, further comprising at least one of:

phase shifters configured to shift phases of the portions of the second optical carrier signal prior to combining with the filtered carrier-suppressed single sideband signals; or phase shifters configured to shift phases of the frequency-converted optical signals.

18. The apparatus of claim 11, wherein the photodetectors comprise first and second balanced photodetectors, different ones of the photodetectors configured to be driven by different ones of the frequency-converted optical signals.

19. The apparatus of claim 11, further comprising:

a hybrid RF element configured to generate in-phase and quadrature components of the RF input signal, wherein the modulator is configured to module the in-phase and quadrature components onto the portion of the first optical carrier signal.

20. The apparatus of claim 11, further comprising:

one or more photonic integrated circuits containing at least one of: the optical sources, the modulator, the optical combiners, or the photodetectors.

\* \* \* \* \*